United States Patent [19]
Ikeuchi et al.

[11] Patent Number: 5,757,513
[45] Date of Patent: May 26, 1998

[54] SIGNAL DISCRIMINATION CIRCUIT

[75] Inventors: Michio Ikeuchi; Shuuichi Yoshikawa, both of Nara; Yasumoto Murata, Nara-ken, all of Japan

[73] Assignee: Sharp Kabushiki Kaisha, Osaka, Japan

[21] Appl. No.: 525,038

[22] Filed: Sep. 8, 1995

Related U.S. Application Data

[63] Continuation of Ser. No. 213,066, Mar. 15, 1994, abandoned.

[30] Foreign Application Priority Data

Mar. 15, 1993 [JP] Japan ................................. 5-054378

[51] Int. Cl.$^6$ .......................... H04N 1/00; H04M 11/00; H04M 3/00
[52] U.S. Cl. ........................ 358/434; 358/438; 379/100; 379/386
[58] Field of Search .................... 358/434, 435, 358/436, 437, 407, 438, 439; 379/100, 418, 96, 97, 98, 386, 93, 88, 89, 351; 381/42, 41, 46

[56] References Cited

U.S. PATENT DOCUMENTS

| | | | |
|---|---|---|---|
| 3,712,959 | 1/1973 | Fariello | 381/46 |
| 4,085,295 | 4/1978 | Goto et al. | 379/386 |
| 4,239,936 | 12/1980 | Sakoe | 381/43 |
| 4,386,239 | 5/1983 | Chien | 379/386 |
| 4,395,595 | 7/1983 | Nishitani et al. | 379/386 |
| 4,580,016 | 4/1986 | Williamson | 379/418 |
| 4,752,958 | 6/1988 | Cavazza et al. | 381/42 |
| 5,185,783 | 2/1993 | Takahashi et al. | 379/97 |
| 5,287,402 | 2/1994 | Nakajima | 358/434 |
| 5,307,404 | 4/1994 | Yatsunami | 379/386 |
| 5,323,246 | 6/1994 | Kotani et al. | 358/434 |
| 5,325,425 | 6/1994 | Novas et al. | 358/434 |
| 5,365,592 | 11/1994 | Horner et al. | 381/46 |

FOREIGN PATENT DOCUMENTS 1212168  8/1989  Japan.

*Primary Examiner*—Edward L. Coles, Sr.
*Assistant Examiner*—Kimberly A. Williams

[57] ABSTRACT

A signal discrimination circuit judges whether an input signal contains a control signal or not, the control signal having a specific frequency and a specific level for a specific time duration. The signal discrimination circuit includes a component power detection device for detecting the power of a component which is in the input signal and having the specific frequency and a level judging device for determining whether the power of the component is equal to or greater than a power reference value. Finally, a control signal judging device is included for determining that the input signal includes the control signal, when the level judging device judges that the power of the component is equal to or greater than the power reference value, continuously for the duration of a reference time.

30 Claims, 7 Drawing Sheets

SIGNAL DISCRIMINATION CIRCUIT

This application is a continuation of application Ser. No. 08/213,066 filed on Mar. 15, 1994, now abandoned.

BACKGROUND OF THE INVENTION

1. Field of the Invention

The present invention relates to a signal discrimination circuit used for facsimile apparatuses, terminal devices for data communication and the like connected to public communication lines such as analog telephone lines and specialized communication lines.

2. Description of the Related Art

Some of facsimile apparatuses have a function for automatically determining whether a signal sent through the telephone lines is a control signal used for the facsimile purpose or a speech signal for telephone communication, and for connecting the telephone lines to the modem of the facsimile or a telephone installed with the facsimile. Such facsimile apparatuses include a signal discrimination circuit for determining whether the input signal is a control signal used for the facsimile purpose or a speech signal for telephone communication.

A conventional signal discrimination circuit described in Japanese Laid-Open Patent Publication No, 1-212168 is shown in the block diagram of FIG. 7. In the conventional signal discrimination circuit 20, the above-described determination is performed in the following manner.

Power P10 of an input signal is determined by a power detection circuit 21 at predetermined time intervals. Power P20 of a carrier for data communication in the input signal is determined by a power detection circuit 22 also at predetermined time intervals. The ratio of the power P20 of the carrier in an input signal with respect to the power P10 of the input signal, namely, the power ratio P20/P10 is detected by a ratio detection circuit 23 at predetermined time intervals. Next whether the power ratio P20/P10 is equal to or greater than a reference value C1 or not is determined by a comparator circuit 24. When the power ratio P20/P10 is determined to be equal to or greater than the reference value C1, the input signal is determined to be a control signal for data communication; and when the power ratio P20/P10 is determined to be smaller than the reference value C1, the input signal is determined to be a speech signal for telephone communication.

However, a speech signal, which includes various frequency components, sometimes includes a specific frequency component of a control signal. If the ratio of such a specific frequency component of a control signal in a speech signal is high by chance, the power ratio P20/P10 may be greater than the reference value C1. In such a case, the speech signal is incorrectly determined to be a control signal for data communication.

Analog telephone lines, which are used under severe circumstances, have a relatively high noise level. Such noise, which includes various frequency components, may have a power ratio P20/P10 which is greater than the reference value C1. In this case also, the noise is incorrectly determined to be a control signal.

As is described above, in the conventional signal discrimination circuit 20, whether an input signal is a control signal or a speech signal is determined based only on the ratio of the power of a specific frequency component in an input signal with respect to the power of the input signal. Accordingly, in the case where the ratio P20/P10 is equal to or greater than the reference value C1 by chance due to the high ratio of the specific frequency component in a speech signal or noise, the input signal is incorrectly determined to be a control signal. Thus, there is an undesirable possibility that a speech signal for telephone communication is connected to the modem of the facsimile.

The above-described problem occurs not only in facsimile apparatuses connected to analog telephone lines, but also in data communication terminals and the like connected to analog telephone lines. The above-described problem also occurs in facsimile apparatuses, data communication terminals, and the like connected to the public communication lines and specialized communication lines in which the analog telephone lines are not used.

SUMMARY OF THE INVENTION

The signal discrimination circuit of this invention is for judging whether an input signal contains a control signal or not, the control signal having a specific frequency and a specific level for a specific time duration. The signal discrimination circuit comprises: component power detection means for detecting the power of a component which is in the input signal and having the specific frequency; level judging means for determining whether the power of the component is equal to or greater than a power reference value; and control signal judging means for determining that the input signal includes the control signal, when the level judging means judges that the power of the component is equal to or greater than the power reference value continuously for the duration of a reference time.

In one embodiment of the invention, the signal discrimination circuit further comprises: input power detection means for detecting the power of an input signal; and ratio judging means for calculating a ratio of the power of the component with respect to the power of the input signal, and determining whether the ratio is equal to or greater than a ratio reference value; wherein the control signal judging means determines that the input signal includes the control signal, when the level judging means judges that the power of the component is equal to or greater than the power reference value continuously for the duration of the reference time and the ratio judging means judges that the ratio is equal to or greater than the ratio reference value continuously for the duration of a prescribed time within the reference time.

In another embodiment of the invention, the control signal is a CNG signal.

In another embodiment of the invention, the prescribed time is shorter than the reference time by 0.2 seconds.

In another embodiment of the invention, the prescribed time is shorter than 0.3 seconds.

In another embodiment of the invention, the reference time is shorter than 0.5 seconds.

In another embodiment of the invention, the power reference value is equal to or greater than −43 dBm.

In another embodiment of the invention, the component power detection means includes a band-pass filter which allows only the component having the specific frequency in the input signal to pass.

In another embodiment of the invention, the signal discrimination circuit further comprises: input power detection means for detecting the power of an input signal; ratio judging means for calculating a ratio of the power of the component with respect to the power of the input signal, and determining whether the ratio is equal to or greater than a ratio reference value; and power change judging means for judging whether a change in the level of the power of the component is within a prescribed value or not; wherein the control signal judging means determines that the input signal includes the control signal, when the level judging means judges that the power of the component is equal to or greater than the power reference value continuously for the duration of the reference time, the ratio judging means judges that the ratio is equal to or greater than the ratio reference value continuously for the duration of a prescribed time within the reference time, and the power change judging means judges that the change of the power of the component in the prescribed time is within the prescribed value.

In another embodiment of this invention, the control signal is a CNG signal.

In another embodiment of this invention, the prescribed time is shorter than the reference time by 0.2 seconds.

In another embodiment of this invention, the prescribed time is shorter than 0.3 seconds.

In another embodiment of this invention, the reference time is shorter than 0.5 seconds.

In another embodiment of this invention, the power reference value is equal to or greater than −43 dBm.

According to the present invention, the power ratio supervision circuit determines whether or not the power ratio of the power of a specific frequency component with respect to the power of an entire input signal is equal to or greater than a first reference value. The power level supervision circuit determines whether or not the power of the specific frequency component is equal to or greater than a second reference value. The power ratio supervision circuit extracts a characteristic of a control signal component of having a single sinusoidal waveform. The power level supervision signal extracts a characteristic of a control signal component having at least a specified minimum level (the second reference value). The control signal determination circuit determines that the input signal includes a control signal component when the power of the specific frequency component is equal to or greater than the second reference value for the duration of a second reference time and further the power ratio is equal to or greater than the first reference value for the duration of a first reference time within the second reference time.

A speech signal for conversation includes both a voice period (a phoneme) and a no-sound period. For example, in conversation in Japanese, a voice period of approximately 0.075 to 0.2 seconds is followed by a no-sound period which is approximately twice as long as the voice period (Sadateru Furui, *Digital Onsei-Shori*, Chapter 2, Basic characteristics of voice, page 18, (Tokai Daigaku Shuppankai)). By contrast, a control signal includes a specific frequency signal maintained at a specified level or higher for a specified time duration. For example, in the case of an automatic calling signal (hereinafter, referred to as the "CNG signal"), which is one type of control signal for facsimile apparatuses, a sinusoidal signal having a frequency of 1100 Hz±38 Hz is maintained at a level of −43 dBm (ITU-T (formerly CCITT) Recommendation T.4) for 0.5 seconds and then kept blank for 3 seconds. The CNG signal is used to inform the addressee that a calling apparatus is an automatic facsimile apparatus.

Accordingly, even if the input signal includes both a control signal component and a speech signal, the signal discrimination circuit according to the present invention detects whether or not the power of the specific frequency component is equal to or greater than the second reference value for a specified time duration for which the control signal component is continuously output. In the case that the specified time duration, in which the control signal component is continuously output, is sufficiently longer than the maximum length of the voice period of a speech signal, the speech signal surely goes into a no-sound period during the above-mentioned specified time duration. Using the no-sound period, it can be determined that the power ratio is equal to or greater than the first reference value.

When the input signal includes only a speech signal, the power ratio may be at the reference value or greater for a short time period. However, the power of the specific frequency component is almost never maintained at the reference value or greater for a longer period than the voice period. Accordingly, there is substantially no possibility that the input signal is incorrectly determined to include a control signal component.

When noise having various frequency components in a wide frequency range is input at a high level, the power of the specific frequency component may be at the second reference value or greater. However, since such noise also includes various other frequency components, there is substantially no possibility that the power ratio of the power of a certain frequency component with respect to the power of the entire input signal is at the second reference value or greater. Accordingly, such noise is not determined to include a control signal component.

As a result, in such a signal discrimination circuit according to the present invention, a control signal can be surely distinguished from a speech signal, noise or other types of signals.

Further, as a condition for determining whether or not the input signal includes a control signal component, the power change supervision circuit determines whether or not the change in the level of the power of the specific frequency component is within a specified range. The power change supervision circuit extracts a characteristic of the control signal component of having a constant level.

In the case of a speech signal or noise, although the power of the specific frequency component or the power ratio may be, at times at the reference values or greater, the power of the specific frequency component changes drastically. By contrast, the power of a control signal component, which is output at a constant level, has almost no change.

By using the detection result obtained by the power change supervision circuit in addition to the other detection results, a control signal is distinguished from a speech signal or noise with higher accuracy.

Thus, the invention described herein makes possible the advantages of providing a signal discrimination circuit for correctly determining whether an input signal is a control signal for data communication or a speech signal for telephone communication.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
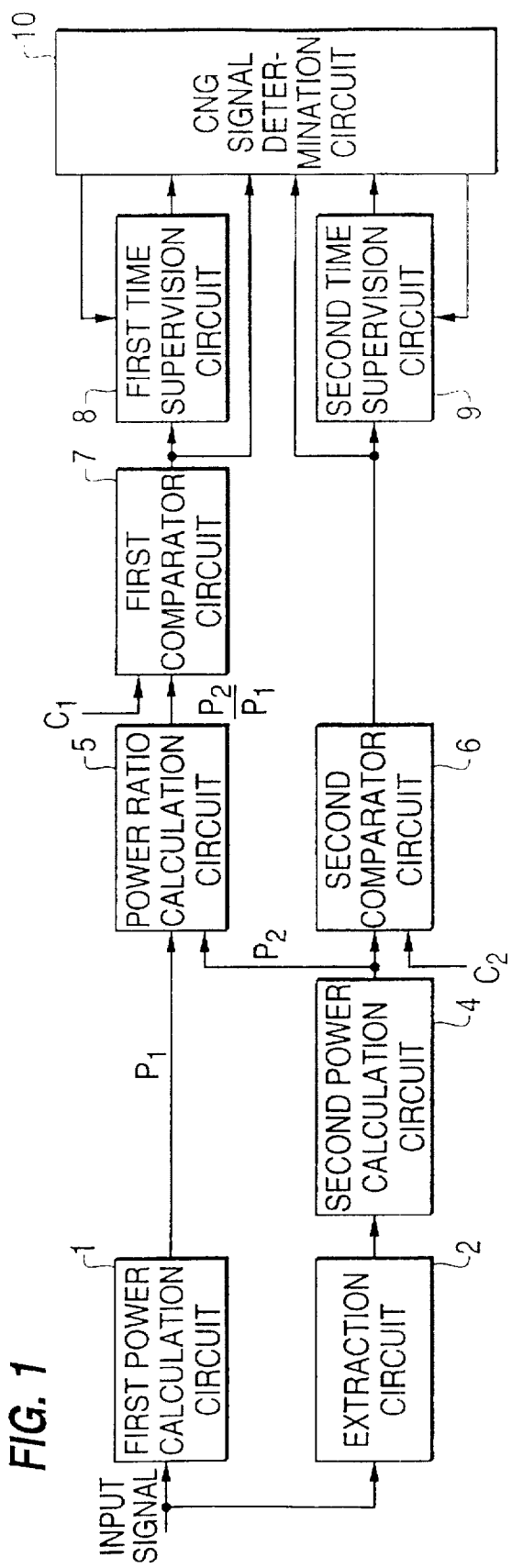
FIG. 1 is a block diagram of a signal discrimination circuit of the first example according to the present invention.
Figure 2:
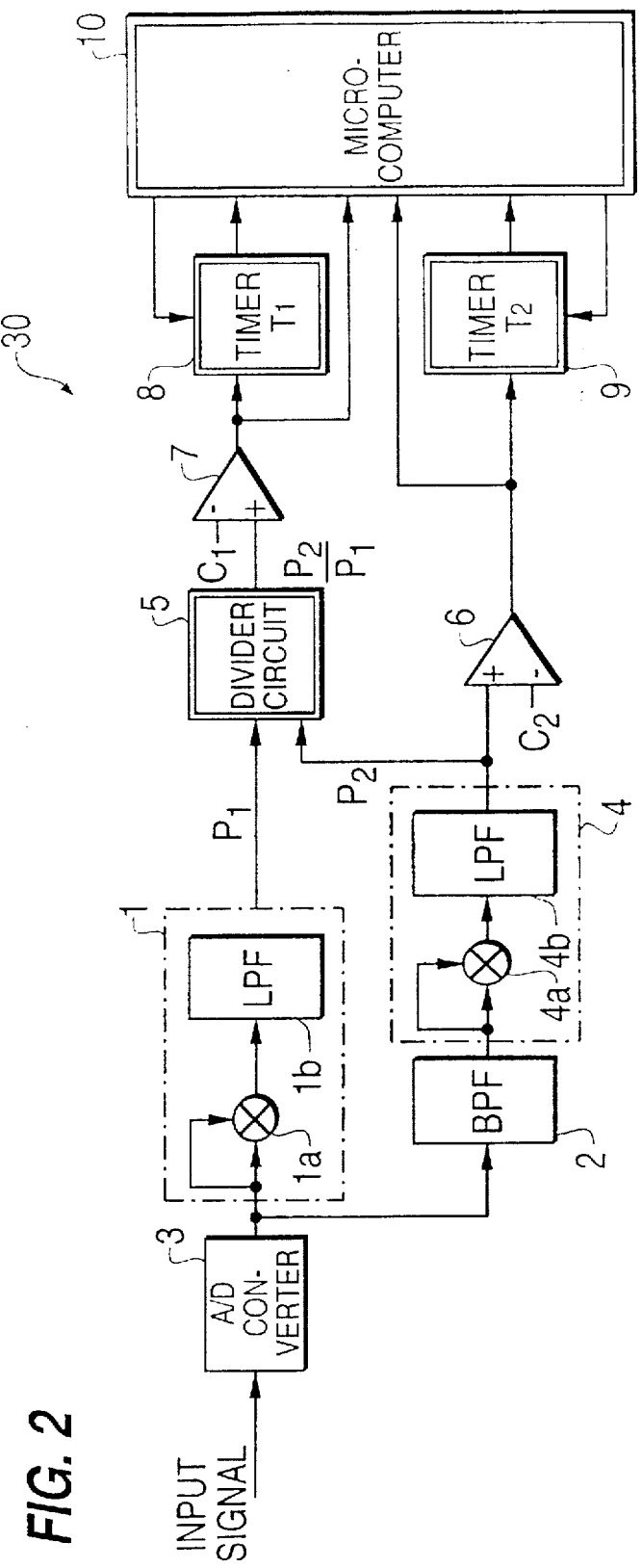
FIG. 2 is a block diagram illustrating a practical configuration of the signal discrimination circuit shown in FIG. 1.
Figure 3:
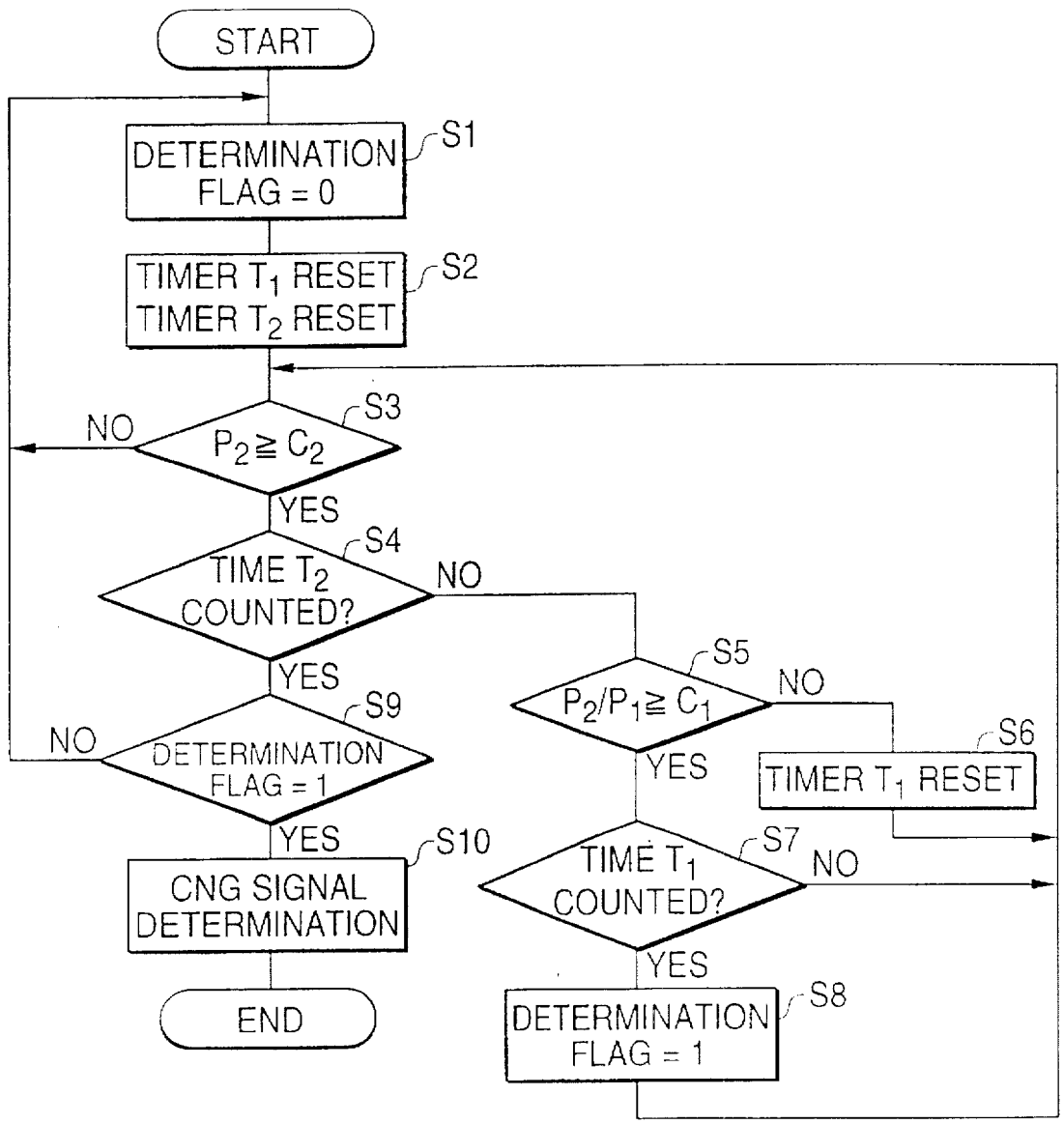
FIG. 3 is a flowchart illustrating the operation of the signal discrimination circuit shown in FIG. 1.

Referring to FIGS. 1 through 3, a first example according to the present invention will be described. FIG. 1 is a block diagram of a signal discrimination circuit 30 of the first example according to the present invention; FIG. 2 is a block diagram of the signal discrimination circuit 30 illustrating a practical configuration of the signal discrimination circuit 30; and FIG. 3 is a flowchart illustrating the operation of the signal discrimination circuit 30.

The signal discrimination circuit 30 determines whether the input signal sent from the facsimile apparatus includes a CNG signal or not.

Operation of the signal discrimination circuit will be described with reference to FIGS. 1 and 2.

As is illustrated in FIG. 1, an input signal sent through telephone lines (not shown) is sent to a first power calculation circuit 1 and also to an extraction circuit 2. As is illustrated in FIG. 2, before being sent to the first power calculation circuit 1 and the extraction circuit 2, an input signal, which is analog, is sampled by an A/D converter 3 using a sampling frequency (for example, 7.2 kHz) to be processed as a digital signal in the signal discrimination circuit 30.

The first power calculation circuit 1 includes a multiplier 1a for obtaining a square of power of the digital signal and a low-pass filter 1b for waveform shaping (FIG. 2). The low-pass filter 1b absorbs instantaneous fluctuations in the waveform of the input signal obtained from the multiplier 1a, and outputs substantially average power. Thus, substantially average power P1 of the entire input signal is output from the first power calculation circuit 1.

As is also shown in FIG. 2, the extraction circuit 2 includes a band-pass filter for allowing only frequency components in the range of 1100 Hz±38 Hz of a CNG signal to pass. The output from the extraction circuit 2 is sent to a second power calculation circuit 4. The second power calculation circuit 4 includes a multiplier 4a and a low-pass filter 4b for waveform shaping, both are of a similar type to the multiplier 1a and the low-pass filter 1b. The second power calculation circuit 4 outputs substantially average power P2 of the frequency component identical with that of the CNG signal in the input signal.

The output from the first power calculation circuit 1 is sent to a power ratio calculation circuit 5. The output from the second power calculation circuit 4 is sent to the power ratio calculation circuit 5 and also to a second comparator circuit 6. The power ratio calculation circuit 5 includes a divider circuit for obtaining the power ratio P2/P1. In the case that an input signal includes only a CNG signal, the power P1 is consistent with the power P2 (P1 and P2 have the same power value). Accordingly, the power ratio P2/P1 is "1". The power ratio calculation circuit 5 outputs the power ratio to a first comparator circuit 7.

The first comparator circuit 7 compares the power ratio P2/P1 sent from the power ratio calculation circuit 5 with a first reference value C1. When the power ratio P2/P1 is equal to or greater than the first reference value C1, the first comparator circuit 7 outputs "1"; and when the power ratio P2/P1 is smaller than the first reference value C1, the first comparator circuit 7 outputs "0". The second comparator circuit 6 compares the power P2 sent from the second power calculation circuit 4 with a second reference value C2. When the power P2 is equal to or greater than the second reference value C2, the second comparator circuit 6 outputs "1"; and when the power P2 is smaller than the second reference value C2, the second comparator circuit 6 outputs "0". The first reference value C1 is set to be an appropriate value to distinguish a CNG signal from a speech signal, noise or the like. The second reference value C2 is set to be the lowest level of the CNG signal. In this example, the second reference value C2 is set to be –43 dBm in conformity with the IETU-T (formerly CCITT) Recommendation T.4. The second reference value C2 can be set to be equal to or greater than –43 dBm.

The output from the first comparator circuit 7 is sent to a first time supervision circuit 8, and the output from the second comparator circuit 6 is sent to a second time supervision circuit 9. The first time supervision circuit 8 includes a timer for counting time while the output from the first comparator circuit 7 is "1". The second time supervision circuit 9 includes a timer for counting time while the output from the second comparator circuit 6 is "1". The first time supervision circuit 8 outputs "1" when a first reference time T1 is completely counted, and the second time supervision circuit 9 outputs "1" when a second reference time T2 is completely counted. The second reference time T2 is set to be a time period which is slightly shorter than 0.5 seconds. 0.5 seconds is a time duration of a CNG signal. The first reference time T1 is set to be shorter than 0.3 seconds, which is obtained by 0.5 seconds–0.2 seconds. 0.2 seconds is the maximum time duration of a voice period of a speech signal.

The output from the first comparator circuit 7 and the output from the second comparator circuit 6 are also sent to a CNG signal determination circuit 10. The CNG signal determination circuit 10 also receives the outputs from the first and the second time supervision circuits 8 and 9. The CNG signal determination circuit 10 resets the first and the second time supervision circuits 8 and 9 to start counting again the first and second reference times T1 and T2. The CNG signal determination circuit 10 includes a microcomputer (FIG. 2) and is connected with the first and the second comparator circuits 7 and 6 and the first and the second time supervision circuits 8 and 9 through I/O ports. The CNG signal determination circuit 10 operates in accordance with a program stored in a ROM and the like built therein.

Control operation of the CNG signal determination circuit 10 will be described with reference to the flowchart in FIG. 3.

In step S1, "0" is written in a determination flag which is set in a RAM area or the like in the CNG signal determination circuit 10. In step S2, the first and the second time supervision circuits 8 and 9 are reset. In step S3, whether the power P2 is equal to or greater than the second reference value C2 or not is determined using the output of the second comparator circuit 6. If not, the program goes back to step S1 and then cycles in the loop of steps S1 through S3 until the power P2 becomes at least the second reference value C2.

If the power P2 is equal to or greater than the second reference value C2, whether the second time supervision circuit 9 has counted the second reference time T2 or not is determined in step S4. If not, whether the power ratio P2/P1 is equal to or greater than the first reference value C1 or not is determined in step S5. If not, the first time supervision circuit 8 is reset in step S6. Then, the program goes back to step S3 and then cycles in the loop of steps S3 through s6.

If the power ratio P2/P1 is equal to or greater than the first reference value C1 in step S5, whether the first time supervision circuit 8 has counted the first reference time T1 or not is determined in step S7. If not, the program goes back to step S3 and then cycles in the loop of steps S3, S4, S5, and S7. If the first time supervision circuit 8 has counted the first reference time T1 in step S7, "1" is written in the determination flag in step S8. Then, the program goes back to step S3, and then cycles in the loop of steps S3, S4, S5, S7, and S8.

If it is determined that the second time supervision circuit 9 finished counting the second reference time T2 in step S4 while the program cycles in the loop of steps S3, S4, S5, and S7 or in the loop of steps S3, S4, S5, S7, and S8, the program advances to step S9, in which whether the determination flag is "1" or not is determined. If "1" has not been written in the determination flag in step S8, namely, if the determination flag is "0", the program goes back to step S1 and then starts again. If "1" has been written in the determination flag in step S8 at least once, namely, the determination flag is "1", the input signal is determined to include a CNG signal in step S10. The operation is completed in this manner.

In other words, the CNG signal determination circuit 10 determines whether or not the power P2 is maintained at the second reference value C2 or greater for the duration of the second reference time T2, which is slightly shorter than 0.5 seconds. Such determination is performed based on a characteristic of a CNG signal of being maintained at −43 dBm or higher for 0.5 seconds. The CNG signal determination circuit 10 also determines whether or not the power ratio P2/P1 is maintained at the first reference value C1 or greater for the duration of the first reference time T1, which is shorter than 0.3 seconds. Such determination is performed based on another characteristic of a CNG signal of being a single sinusoidal signal (a signal having a sine wave) having a frequency in the range of 1100 Hz±38 Hz. If the power P2 and the power ratio P2/P1 are both maintained at the above-specified values respectively, the input signal is determined to include a CNG signal.

Hereinafter, practical operation of the signal discrimination circuit 30 will be described concerning different types of input signals.

(1) When the input signal includes only a CNG signal:

The power P2 is equal to or greater than the second reference value C2, and the power ratio P2/P1 is equal to or greater than the first reference value C1. Accordingly, after steps S1 and S2, the program cycles in the loop of steps S3, S4, S5, and S7. When the first reference time T1 is completely counted, "1" is written in the determination flag in step S8. If the determination flag is "1" when the second reference time T2 is completely counted, the program advances to step S10 from step S9, and the input signal is determined to be a CNG signal.

(2) When the input signal includes only a speech signal:

Usually, the program cycles in the loop of steps S1 through S3. In the case that the speech signal includes a frequency component identical with that of a CNG signal at a high level, the program advances to the loop of steps S3 through S6. Further, in the case that the ratio of the frequency component identical with that of the CNG signal becomes high by chance, the program cycles in the loop of S3, S4, S5, and S7.

However, the maximum duration of a voice period (a phoneme) in speech, for example, in the case of conversation in Japanese, is 0.2 seconds. Accordingly, the speech signal goes into a no-sound period before the second reference time T2 (namely, approximately 0.5 seconds) is completed. At this point, the power P2 becomes less than the second reference value C2, and the operation goes back to step S1.

Due to such a system, when the input signal includes only a speech signal, the input signal is not determined to include a CNG signal.

(3) When an input signal includes both a CNG signal and a speech signal:

Since the power P2 is equal to or greater than the second reference value C2, the program cycles in the loop of steps S3 through S6 after steps S1 and S2. The speech signal goes into a no-sound period in 0.2 second (namely, in the longest phoneme duration time). At this point, the power ratio P2/P1 becomes equal to or greater than the first reference value C1. Accordingly, the program cycles in the loop of steps S3, S4, S5, and S7. Then the first reference time T1 is completely counted during such a cycle, and "1" is written in the determination flag in step S8. Accordingly, even if the no-sound period finishes and the program again cycles in the loop of steps S3 through S6, the program advances to steps S9 and S10 after the second reference time T2 is completely counted. In this manner, the input signal is determined to include a CNG signal.

As is described above, a CNG signal is surely distinguished from a speech signal in a signal discrimination circuit according to the first example according to the present invention.

EXAMPLE 2

Figure 4:
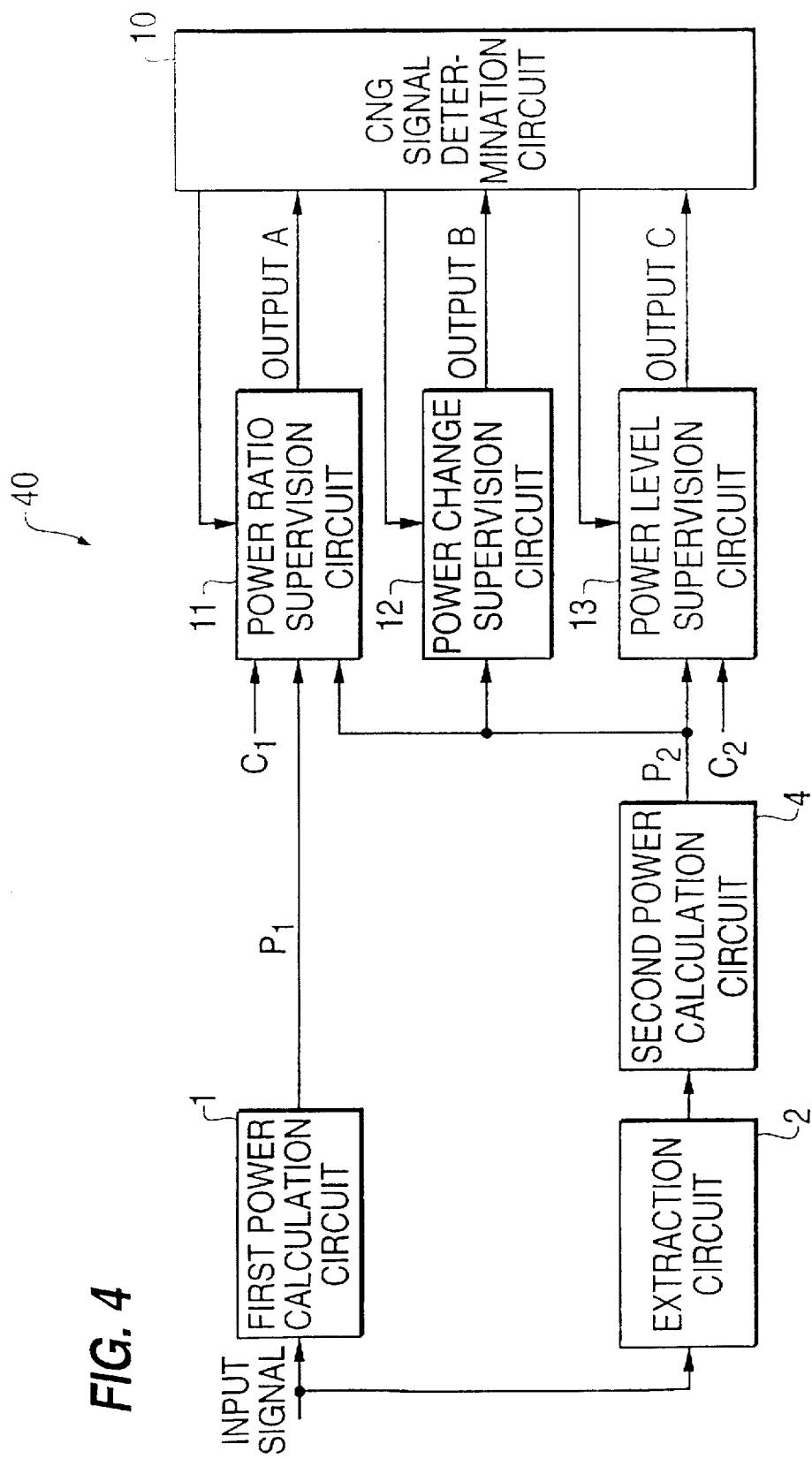
FIG. 4 is a block diagram of a signal discrimination circuit of the second example according to the present invention.
Figure 5:
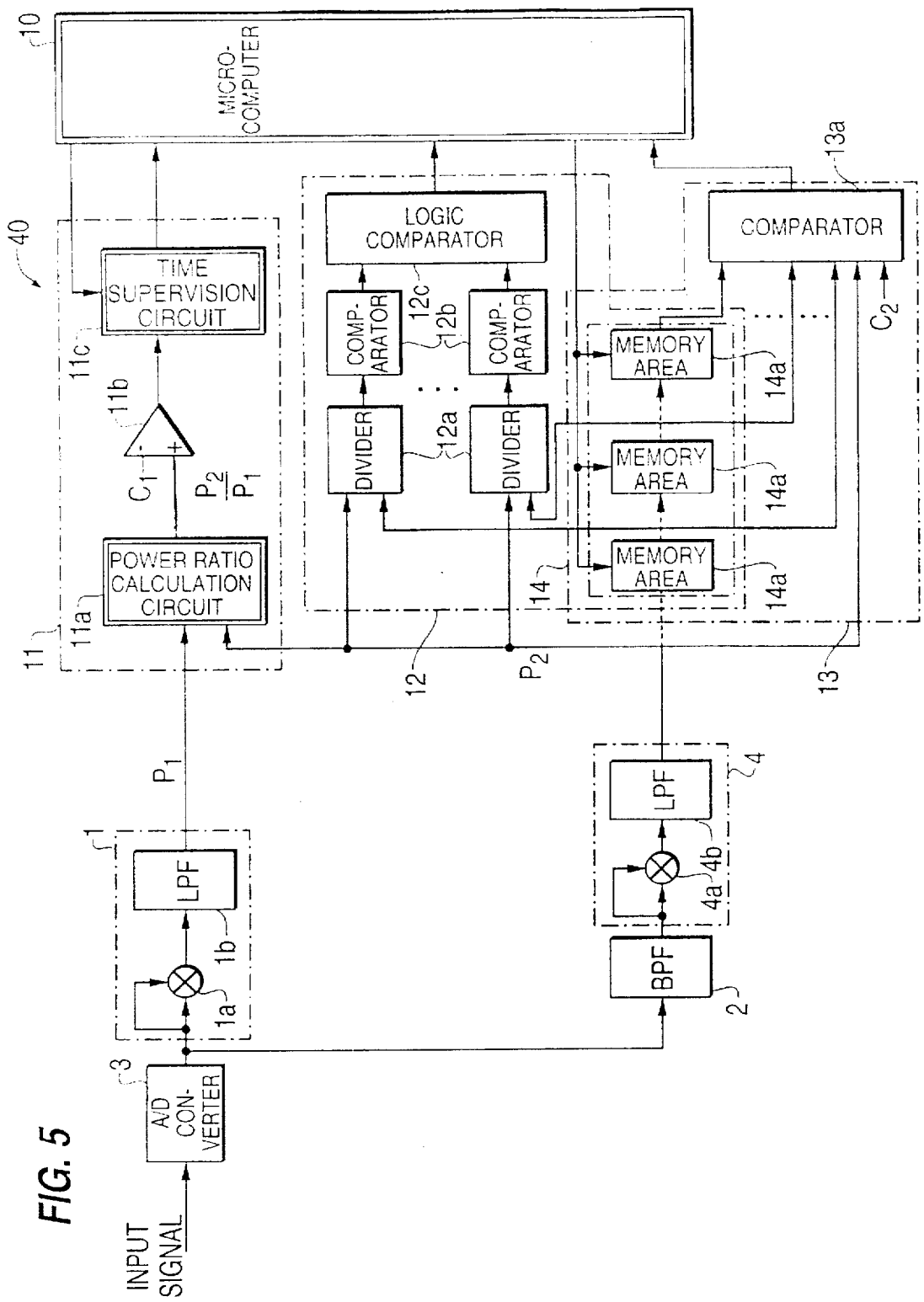
FIG. 5 is a block diagram illustrating a practical configuration of the signal discrimination circuit shown in FIG. 4.
Figure 6:
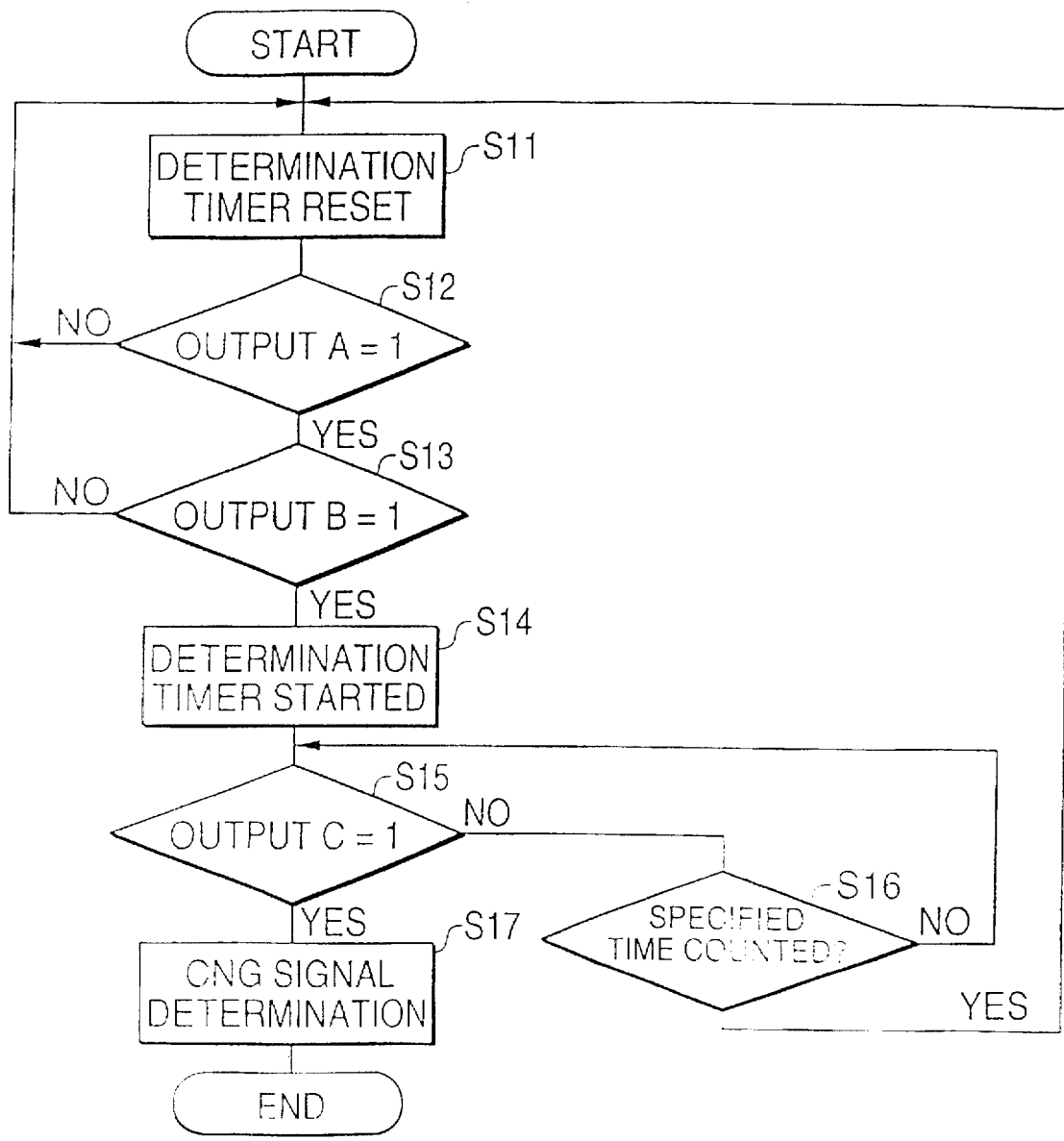
FIG. 6 is a flowchart illustrating operation of the signal discrimination circuit shown in FIG. 4.
Figure 7:
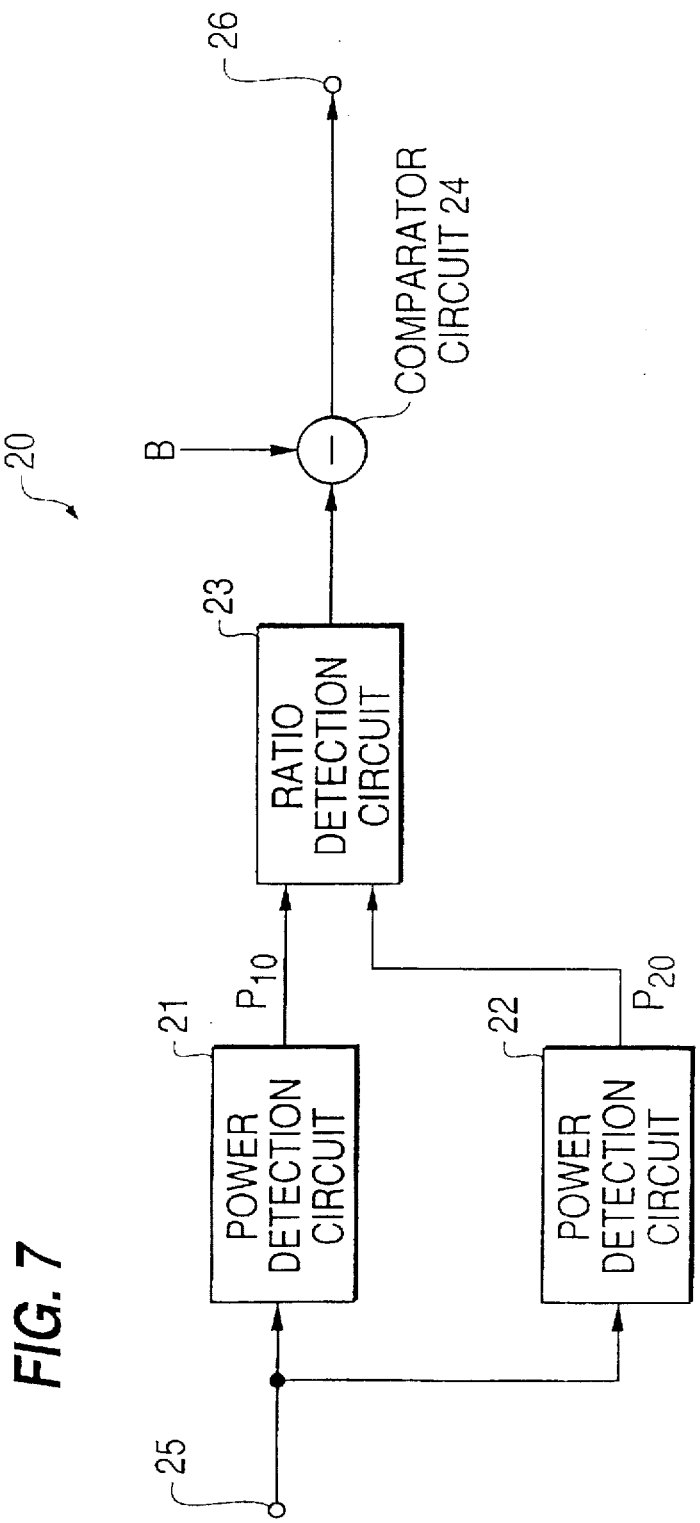
FIG. 7 is a block diagram of a conventional signal discrimination circuit.

Referring to FIGS. 4 through 6, a second example according to the present invention will be described. FIG. 4 is a block diagram of a signal discrimination circuit 40 in the second example according to the present invention; FIG. 5 is a block diagram of the signal discrimination circuit 40 illustrating a practical configuration of the signal discrimination circuit 40; and FIG. 6 is a flowchart illustrating operation of the signal discrimination circuit 40. Identical elements as those in the first example bear identical reference numerals therewith.

The signal discrimination circuit 40 determines whether or not the signal the facsimile apparatus or the like receives includes, a CNG signal.

Operation of the signal discrimination circuit 40 will be described with reference to FIGS. 4 and 5.

An input signal sent through telephone lines (not shown) is sent to a first power calculation circuit 1 and also to a extraction circuit 2. An output from the extraction circuit 2 is sent to a second power calculation circuit 4. As is illustrated in FIG. 5, before being sent to the first power calculation circuit 1 and the extraction circuit 2, an input signal, which is analog, is sampled by an A/D converter 3 using a sampling frequency (for example, 7.2 kHz) to be processed as a digital signal in the signal discrimination circuit 40. The first power calculation circuit 1 and the extraction circuit 2 in the second example have identical structures as those in the first example.

An output from the first power calculation circuit 1 and an output from the second power calculation circuit 4 are both sent to a power ratio supervision circuit 11. As is illustrated in FIG. 5, the power ratio supervision circuit 11 includes a power ratio calculation circuit 11a, a first comparator circuit 11b, and a time supervision circuit 11c. The power ratio calculation circuit 11a, the first comparator circuit 11b, and the time supervision circuit 11c respectively correspond to the power ratio calculation circuit 5, the first comparator circuit 7, and the first time supervision circuit 8 in the first example. The first comparator circuit 11b outputs "1" when the power ratio P2/P1 is equal to or greater than the first reference value C1, and outputs "0" when the power ratio P2/P1 is smaller than the first reference value C1. The time supervision circuit 11c includes a timer for counting time while the output from the first comparator circuit 11b is "1", and outputs "1" as output A after finishing counting the first reference time T1.

The output from the second power calculation circuit 4 is also sent to a power change supervision circuit 12 and a power level supervision circuit 13. The power change supervision circuit 12 and the power level supervision circuit 13 share a shift register 14 including a plurality of memory areas 14a (FIG. 5). The power P2 output from the second power calculation circuit 4 is sequentially stored in the memory areas 14a. The shift register 14 sequentially shifts the power P2 by a clock signal, and stores the levels of the power P2 for the duration of the second reference time T2. The latest level of the power P2 is stored in the memory area 14a on one end of the shift register 14, and the oldest level of the power P2 is stored in the memory area 14a on the other end of the shift register 14. The power change supervision circuit 12 further includes a plurality of dividers 12a, a plurality of comparators 12b, and a logic circuit 12c. The plurality of dividers 12a output the ratios of the current level of the power P2 output from the second power calculation circuit 4 with respect to the levels of the powers P2 stored in the memory areas 14a, respectively. The plurality of comparators 12b compare the ratios with a threshold level. It should be noted that only the levels corresponding to the first reference time T1 are used to obtain the ratios, among the levels stored in the memory areas 14a. Then, the power change supervision circuit 12 determines whether each obtained ratio is within a threshold level or not, and if all the obtained ratios are within the threshold level, the logic circuit 12c outputs "1" as output B. If at least one of the obtained ratios exceeds the threshold level, the logic circuit 12c outputs "0" as output B.

The power level supervision circuit 13 includes a comparator 13a. The current level of the power P2 and the levels of the powers P2 stored in the memory areas 14a corresponding to the first reference time T1 are input to the comparator 13a. If all the levels are equal to or greater than the second reference value C2, the comparator 13a outputs "1" as output C. If at least one of the levels is lower than the second reference value C2, the comparator 13a outputs "0" as output C. The power level supervision circuit 13 substantially functions in the same manner as the combination of the second comparator circuit 6 and the second time supervision circuit 9 in the first example.

The output A from the power ratio supervision circuit 11, the output B from the power change supervision circuit 12, and the output C from the power level supervision circuit 13 are all sent to a CNG signal determination circuit 10. Based on a signal sent from the CNG signal determination circuit 10, the time supervision circuit 11c of the power ratio supervision circuit 11 is reset. The clock signal for the shift register 14 is supplied by the CNG signal determination circuit 10.

Control operation of the CNG signal determination circuit 10 will be described with reference to the flowchart in FIG. 6.

In step S11, a determination timer built in the CNG signal determination circuit 10 is reset. In step S12, whether the output A from the power ratio supervision circuit 11 is "1" or not is determined. In step S13, whether the output B from the power change supervision circuit 12 is "1" or not is determined. If the output A is not "1" in step S12, the program goes back to step S11. If the output "B" is not "1" in step S13, the program also goes back to step S11.

If the outputs A and B are both determined to be "1", a determination timer starts in step S14, then, in step S15, whether the output C from the power level supervision circuit 13 is "1" or not is determined. If not, whether the determination timer has counted the specified time or not is determined in step S16. If not, the program goes back to step S15 and then cycles in the loop of steps S15 and S16. The specified time for the determination timer is set to be equal to or longer than T2−T1. As is mentioned above, the second reference time T2 is slightly shorter than 0.5 seconds, for which a CNG signal is continuously outputted. The first reference time T1 is the time which is counted by the power ratio supervision circuit 11.

If the output C becomes "1" while the program cycles in the loop of steps S15 and S16, this indicates that the power P2 is maintained at the second reference value C2 or greater for the duration of the second reference time T2. Accordingly, the input signal is determined to include a CNG signal in step S17, and the operation is completed.

If the determination timer finishes counting the specified time while the output C remains "0", this indicates that the power P2 is not maintained at the second reference value C2 level or higher for the duration of the second reference time T2. Accordingly, the program goes back to step S11 and then starts again.

In other words, the CNG signal determination circuit 10 determines whether or not the power P2 is maintained at the second reference value C2 or greater for the duration of the second reference time T2, which is slightly shorter than 0.5 seconds. Such determination is performed based on the same principle as in the first example. The CNG signal determination circuit 10 also determines whether or not the power ratio P2/P1 is maintained at the first reference value C1 or greater for the duration of the first reference time T1, which is shorter than 0.3 seconds. Such determination is also performed based on the same principle as in the first example. Further, the CNG signal determination circuit 110 determines whether or not the change in the level of the power P2 for the duration of the first reference time T1 is within the threshold level. Such determination is performed based on a characteristic of A CNG signal of being output at a constant level. If the power P2 and the power ratio P2/P1 are both maintained at the above-specified values respectively, and the change in the level of the power P2 is within the threshold level, the input signal is determined to include a CNG signal.

Hereinafter, practical operation of the signal discrimination circuit 40 will be described concerning different types of input signals.

(1) When the input signal includes only a CNG signal:

The power ratio P2/P1 is equal to or greater than the first reference value C1, and there is no change in the level of the power P2. Accordingly, the program which cycles in the loop of steps S11 through S13 for the duration of the first reference time T1, advances to step S14, and then cycles in the loop of steps S15 and S16. Since the power P2 is maintained at the second reference value C2 or greater for the duration of the second reference time T2, the output C becomes "1", and the program advances to step S17. In this manner, the input signal is determined to include a CNG signal.

(2) When the input signal includes only a speech signal:

Usually, the program cycles in the loop of steps S11 and S12. In the case that the speech signal includes a frequency component identical with that of a CNG signal at a high ratio, the program cycles in the loop of steps S11 through S13. However, the speech signal is not output at a constant level as a CNG signal is, and the change in the level of the power P2 is drastic. Accordingly, there is substantially no possibility that the program advances to step S14.

In the case that the change in the level of the power P2 is small by chance, it is possible that the program advances to the loop of steps S15 and S16.

However, a voice period (a phoneme) of a speech signal is shorter than the second reference time T2. Since the speech signal goes into a no-sound period in the second reference time T2, the power P2 becomes smaller than the second reference value C2 in the second reference time T2. Therefore, the output C from the power level supervision circuit 13 does not become "1". Since the determination timer finishes counting the specified time in step S16 while the program cycles in the loop of steps S15 and S16, the program goes back to step S11 and starts again.

Due to such a system, a speech signal is not determined to include a CNG signal.

(3) When an input signal includes both a CNG signal and a speech signal:

The outputs A and B from the power ratio supervision circuit 11 and the power change supervision circuit 12 both become "1" in the no-sound period of the speech signal. Therefore, the program advances from the loop of steps S11 through S13 to the loop of steps S15 and S16. The power P2 is maintained at the second reference value C2 for the duration of the second reference time T2. Accordingly, the program advances to step S17, in which the input signal is determined to include a CNG signal.

(4) When the input signal includes only noise:

Usually, the program cycles in the loop of steps S11 and S12. Noise includes various frequency components in a wide frequency range. In the case that noise includes a frequency component identical with that of a CNG signal at a high ratio by chance, the program cycles in the loop of steps S11 through S13. However, the change in the level of the power P2 is drastic as is in the case of speech signal. Therefore, there is substantially no possibility that the program advances to step S14.

In the case that the change in the level of the power P2 is small by chance, it is possible that the program advances to the loop of steps S15 and S16.

However, it is impossible that the noise is maintained at the second reference value C2 or greater for the duration of the second reference time T2. Accordingly, the output C from the power level supervision circuit 13 does not become "1". Since the determination timer finishes counting the specified time in step S16 while the program cycles in the loop of steps S15 and S16, the program goes back to step S11 and starts again.

Due to such a system, the input signal including only noise is not determined to include a CNG signal.

(5) When the input signal includes both a CNG signal and noise:

There is substantially no possibility that only a frequency component identical with that of a CNG signal of noise is included in such a signal at a high ratio. Further, in normal communication lines, the power ratio of a CNG signal with respect to noise is sufficiently high. The input signal is surely determined to include a CNG signal as in the case of (1).

As is described above, in the examples of this invention, a condition for determining whether the input signal includes a CNG signal or not is added to the conditions used in the conventional example. Accordingly, a control signal is distinguished from a speech signal and/or noise with still higher accuracy.

In a signal discrimination circuit according to the present invention, a control signal can surely be distinguished from a speech signal and/or noise. Therefore, no malfunction occurs in apparatuses using such a signal discrimination circuit.

In the examples of this invention, the CNG signal is used as the control signal. However, the control signal is not limited to only the CNG signal, and a DTMF signal or the like can also be used as the control signal. The signal discrimination circuit of this invention can also be used for judging whether or not the input signal contains a DTMF signal or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A signal discrimination circuit for judging whether an input signal includes a control signal or not, the control signal having a specific frequency and a specific level for a specific time duration, the signal discrimination circuit comprising:

component power detection means for detecting the power of a component within the input signal, having the specific frequency;

level judging means for determining whether the power of the component is equal to or greater than a power reference value for each of a plurality of successive time periods; and control signal judging means for judging that the input signal includes the control signal, when the level judging means judges that the power of the component is equal to or greater than the power reference value for at least N of the plurality of successive time periods, N being greater than or equal to 2, and N corresponding to a reference period of time, wherein the control signal is a non-voice signal.

2. A signal discrimination circuit for judging whether an input signal includes a control signal or not, the control signal having a specific frequency and a specific level for a specific time duration, the signal discrimination circuit comprising:

component power detection means for detecting the power of a component within the input signal, having the specific frequency;

level judging means for determining whether the power of the component is equal to or greater than a power reference value for each of a plurality of successive time periods;

input power detection means for detecting the power of an input signal;

ratio judging means for calculating a ratio of the power of the component with respect to the power of the input signal, and determining whether the ratio is equal to or greater than a ratio reference value for each of a plurality of successive time periods; and control signal judging means for judging that the input signal includes the control signal, when the level judging means judges that the power of the component is equal to or greater than the power reference value for at least N of the plurality of successive time periods, N being greater than or equal to 2, and N corresponding to a reference period of time and the ratio judging means judges that the ratio is equal to or greater than the ratio reference value for at least N2 of the plurality of successive time periods, N2 being greater than 2, and N2 corresponding to a prescribed period of time within the reference period of time.

3. A signal discrimination circuit according to claim 2, wherein the control signal is a CNG signal.

4. A signal discrimination circuit according to claim 3, wherein the prescribed period of time is shorter than the reference period of time by 0.2 seconds.

5. A signal discrimination circuit according to claim 3, wherein the prescribed period of time is shorter than 0.3 seconds.

6. A signal discrimination circuit according to claim 3, wherein the reference period of time is shorter than 0.5 seconds.

7. A signal discrimination circuit according to claim 3, wherein the power reference value is equal to or greater than −43 dBm.

8. A signal discrimination circuit according to claim 1, wherein the component power detection means includes a band-pass filter which passes only the component, within the input signal, having the specific frequency.

9. A signal discrimination circuit for judging whether an input signal includes a control signal or not, the control signal having a specific frequency and a specific level for a specific time duration, the signal discrimination circuit comprising:

component power detection means for detecting the power of a component within the input signal, having the specific frequency;

level judging means for determining whether the power of the component is equal to or greater than a power reference value for each of a plurality of successive time periods;

input power detection means for detecting the power of an input signal;

ratio judging means for calculating a ratio of the power of the component with respect to the power of the input signal, and determining whether the ratio is equal to or greater than a ratio reference value for each of a plurality of successive time periods;

power change judging means for judging whether a change in the level of the power of the component is within a prescribed value or not; and control signal judging means for judging that the input signal includes the control signal, when the level judging means judges that the power of the component is equal to or greater than the power reference value for at least N of the plurality of successive time periods, N being greater than or equal to 2, and N corresponding to a reference period of time, the ratio judging means judges that the ratio is equal to or greater than the ratio reference value for at least N2 of the plurality of successive time periods, N2 being greater than or equal to 2, and N2 corresponding to a prescribed period of time within the reference period of time, and the power change judging means judges that the change in the level of the power of the component in the prescribed period of time is within the prescribed value.

10. A signal discrimination circuit according to claim 9, wherein the control signal is a CNG signal.

11. A signal discrimination circuit according to claim 10, wherein the prescribed period of time is shorter than the reference period of time by 0.2 seconds.

12. A signal discrimination circuit according to claim 10, wherein the prescribed period of time is shorter than 0.3 seconds.

13. A signal discrimination circuit according to claim 10, wherein the reference period of time is shorter than 0.5 seconds.

14. A signal discrimination circuit according to claim 10, wherein the power reference value is equal to or greater than −43 dBm.

15. A signal discrimination circuit according to claim 1, wherein the control signal is a facsimile signal.

16. A signal discrimination method for judging whether an input signal includes a control signal or not, comprising the steps of:

(a) detecting the power of a component within the input signal, having a specific frequency;

(b) determining whether the power of the component is equal to or greater than a power reference value for each of a plurality of successive time periods; and (c) judging that the input signal includes the control signal, when it is determined in step (b) that the power of the component is equal to or greater than the power reference value for at least N of the plurality of successive time periods, N being greater than or equal to 2, and N corresponding to a reference period of time, wherein the control signal is a non-voice signal.

17. A signal discrimination method for judging whether an input signal includes a control signal or not, comprising the steps of:

(a) detecting the power of a component within the input signal, having a specific frequency;

(b) determining whether the power of the component is equal to or greater than a power reference value for each of a plurality of successive time periods;

(c) detecting the power of an input signal;

(d) calculating a ratio of the power of the component with respect to the power of the input signal, and determining whether the ratio is equal to or greater than a ratio reference value for each of a plurality of successive time periods; and (e) judging that the input signal includes the control signal, when it is determined in step (b) that the power of the component is equal to or greater than the power reference value for at least N of the plurality of successive time periods, N being greater than or equal to 2, and N corresponding to a reference period of time, and when it is determined in step (d) that the ratio is equal to or greater than a ratio reference value for at least N2 of the plurality of successive time periods, N2 being greater than or equal to 2, and N2 corresponding to a prescribed period of time within the reference period of time.

18. A signal discrimination method according to claim 17, wherein the control signal is a CNG signal.

19. A signal discrimination method according to claim 18, wherein the prescribed period of time is shorter than the reference period of time by 0.2 seconds.

20. A signal discrimination method according to claim 18, wherein the prescribed period of time is shorter than 0.3 seconds.

21. A signal discrimination method according to claim 18, wherein the reference period of time is shorter than 0.5 seconds.

22. A signal discrimination method according to claim 18, wherein the power reference value is equal to or greater than −43 dBm.

23. A signal discrimination method for judging whether an input signal includes a control signal or not, comprising the steps of:

(a) detecting the power of a component within the input signal, having a specific frequency;

(b) determining whether the power of the component is equal to or greater than a power reference value for each of a plurality of successive time periods;

(c) detecting the power of an input signal;

(d) calculating a ratio of the power of the component with respect to the power of the input signal, and determining whether the ratio is equal to or greater than a ratio reference value for each of a plurality of time periods;

(e) judging whether a change in the level of the power of the component is within a prescribed value for each of a plurality of successive time periods; and (f) judging that the input signal includes the control signal, when it is determined in step (b) that the power of the component is equal to or greater than the power reference value for at least N of the plurality of successive time periods, N being greater than or equal to 2 and N corresponding to the reference period of time, when it is determined in step (d) that the ratio is equal to or greater than a ratio reference value for at least N2 of the plurality of successive time periods, N2 being greater than or equal to 2, and N2 corresponding to a prescribed period of time within the reference period of time, and when it is judged in step (e) that the change in the level of the power of the component in the at least N2 of the plurality of successive time periods is within the prescribed value.

24. A signal discrimination method according to claim 23, wherein the control signal is a COG signal.

25. A signal discrimination method according to claim 24, wherein the prescribed period of time is shorter than the reference period of time by 0.2 seconds.

26. A signal discrimination method according to claim 24, wherein the prescribed period of time is shorter the 0.3 seconds.

27. A signal discrimination method according to claim 24, wherein the reference period of time is shorter than 0.5 seconds.

28. A signal discrimination method according to claim 24, wherein the power reference value is equal to or greater than −43 dBm.

29. A signal discrimination method according to claim 16, wherein step (a) includes the substep of detecting the power component by a band-pass filter which allows only the component, within the input signal and having the specific frequency, to pass.

30. A signal discrimination method according to claim 16, wherein the control signal is a facsimile signal.

* * * * *